Nov. 30, 1954   H. SCHOTTLER   2,695,527
TORQUE LOADING DEVICE
Filed Sept. 21, 1951
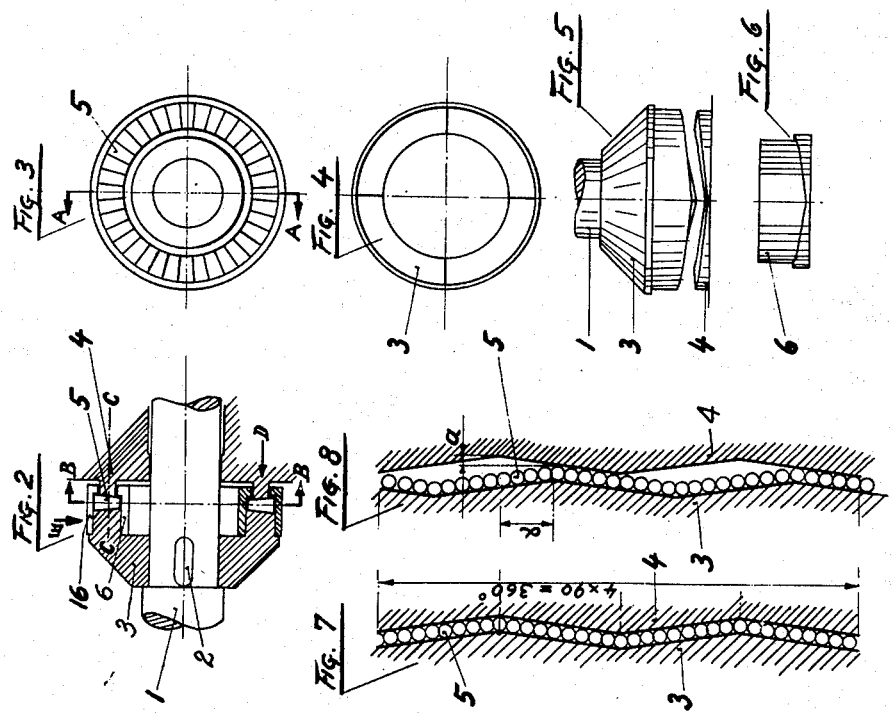
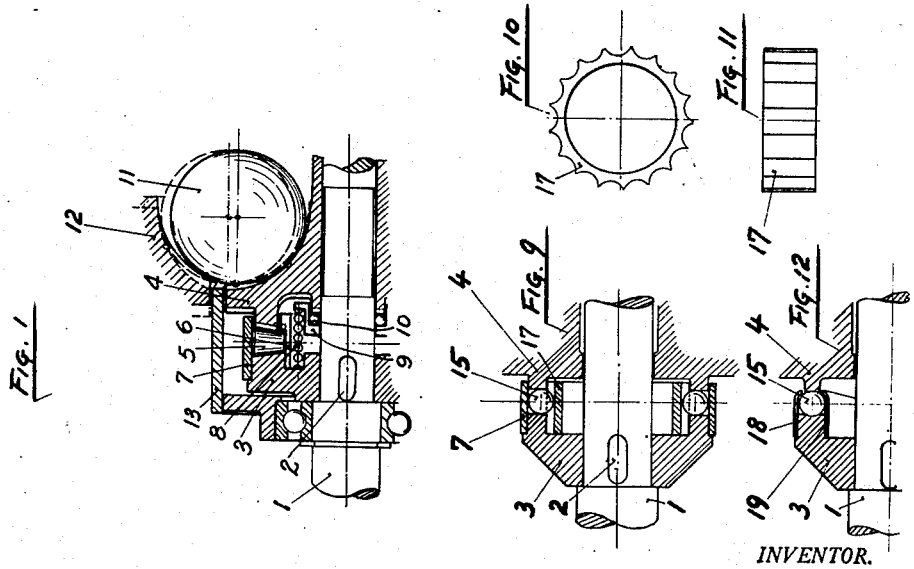
INVENTOR.
Henry Schottler
BY
AGENT

United States Patent Office 2,695,527
Patented Nov. 30, 1954

2,695,527

TORQUE LOADING DEVICE

Henry Schottler, New Orleans, La., assignor, by mesne assignments, to Roller Gear Company, Inc., a corporation of New York Application September 21, 1951, Serial No. 247,720

8 Claims. (Cl. 74—208)

This invention relates to pressure transformers or couplings as they are used in brakes, friction couplings, friction gears, and the like, for generating axial thrusts in response to the torques of rotating bodies, which thrusts produce the required pressure between frictionally engaged elements to transmit desired torques. In distinction to the torque transmitting gear elements, said pressure transformers are frequently defined as the torque loading elements.

Such devices usually comprise a pair of relatively rotatable discs having cooperating inclined surfaces serving as races for rolling elements, which force the discs apart in axial direction. The resulting axial thrusts are transmitted to the frictionally engaged gear elements, whereby the axial pressures increase and decrease proportionally to the torque passing through the device and ensure a slipfree power transmission when the angles of the inclined raceways have been correctly chosen.

These known torque loading means are of relatively simple construction and give a satisfactory performance in all couplings and friction gears where the axial distance of the torque transmitting friction elements remains constant.

However, rather complicated constructions are necessary in pressure transmitters for aggregates, e. g. variable speed drive mechanisms, where the axial distance between the frictionally engaged torque transmitting elements is variable and where the axial distance between the coupling discs of the thrust loading means has to be varied too, conforming to the variable ratio of transmission.

The difficulties in designing pressure transformers for variable speed drive mechanisms arise from the fact that the angle to be given to the inclined surfaces of the discs and the relative axial displacement of the discs are determined by the axial thrusts required for the power transmission, and that at least two uniformly spaced rolling elements have to be arranged in the raceway formed by said inclined surfaces. These pressure transmitting rolling elements require not only controlling means to maintain their uniform spacing but separate means to ensure their correct position with respect to the raceway. Such special means, for instance of the planetary type, result in a very complicated construction of such transformers or couplings.

In my co-pending application, Serial No. 209,543, filed February 6, 1951, I have disclosed and claimed a pressure transformer wherein a bushing is slidably secured to the driven shaft of a variable speed transmission in spaced relationship to an axially displaceable element of the speed transmission proper and wherein cooperating inclined opposite surfaces are given to the transmission element and the bushing which form a raceway for balls, which are at all times under axial spring pressure. This construction requires a rather delicate design of the raceways and has some drawbacks for the transmission of very heavy loads.

The main object of this invention is to simplify the construction of pressure transformers or couplings for variable speed transmission mechanisms.

Another object of the invention is to provide simple additional guiding means for preventing a displacement of the rolling elements in pressure transformers at the places where they are not positively confined between the two oppositely arranged faces of the torque loading members.

These and other objects of the invention are set forth in detail in the following description.

The present invention makes it possible to transmit in a simple manner the torque to a variable speed drive through a thrust loading device, which consists of the conventional pair of relatively rotatable discs and interposed balls or rollers rolling on cooperating wedging tracks of said discs. The novel features of my invention consist in the axially displaceable arrangement of one of said discs and of wedging tracks which are formed by contiguous recesses, each recess consisting of a pair of oppositely inclined surfaces. A plurality of roller bodies is placed in each of said recesses, which roller bodies are uniformly spaced over the whole circumference of the wedging track and held in said spaced relationship.

In the accompanying drawing, illustrating by way of example different embodiments of the invention, Fig. 1 is a fragmentary longitudinal section of a pressure transformer of this invention applied to a variable speed drive of the planetary type;

Fig. 2 shows in longitudinal section a second embodiment of the invention;

Fig. 3 is a cross-section in plane BB of Fig. 2;

Fig. 4 is a front view of part 3 in Fig. 2;

Fig. 5 is a plan view of parts 3 and 4 of Fig. 2 in direction of arrow E;

Fig. 6 is a plan view of part 6 of Fig. 2 in direction of the arrow E;

Fig. 7 is a development of the wedging surfaces of the pressure discs in their closest axial position, where they are in frictional contact with all the interposed roller bodies;

Fig. 8 is a similar development showing the discs spaced wider apart in a position where the load is transmitted by only a portion of the interposed rollers;

Fig. 9 is in longitudinal section a further example of the invention, while

Figs. 10 and 11 show part 17 of Fig. 9 in front and plan view;

Fig. 12 shows in longitudinal section another embodiment of the invention.

The main drive shaft 1 (Figs. 1, 2, 9, and 12) is integrally connected by key 2 to a torque transmitting disc 3. Coaxially to disc 3 and opposite to it, a second disc 4 is so located on shaft 1 that it can freely rotate and slide on it. The sides of these discs facing each other are provided with a number of axially projecting and receding wedge-like portions parallel to each other (Fig. 7), which form a zigzag groove and raceway for rolling elements 5 or 15, respectively.

To obtain a satisfactory and reliable transmission of the torque passing through the device with a minimum of sliding resistance, at least two rolling elements have to be provided in each recess of the raceway; one rolling element rolls on either of the oppositely inclined surfaces forming the recess which ensures that at least one rolling element is at all times positively engaged between the pressure discs. I prefer to fill the raceway with substantially contiguous rolling elements, directly arranged behind each other with very little circumferential play, so that this portion of my device can be compared to a roller or ball bearing, in which the races are not in a single plane but form a wave-like or zigzag ascending and descending raceway.

This arrangement has, in addition to the constructive simplicity, the advantage of ensuring a uniform distribution of the load and of permitting greater angular displacements between the pressure discs.

A compression spring 8 (Fig. 1) holds the discs 3 and 4 apart and secures a minimum frictional coupling even if no torque is transmitted (idling of the pressure transformer). A thrust ball bearing, formed by balls 10 between the discs 4 and a spring holder 9, is interposed between disc 4 and spring 8, in order to eliminate the sliding friction under the pressure of spring 8, when the discs 3 and 4 are shifted relatively to each other.

The rolling elements of the pressure transformers shown in Figs. 1 and 2 are truncated cones 5, which are particularly suitable for the transmission of heavy loads. Balls 15 are used in the embodiments of Figs. 9 and 12.

Various simple means, like sleeves, flanges, or rings, may be provided to hold the rolling elements in their correct position.

The rolling elements 5 of Fig. 1 are confined at their inner ends alone by a flanged sleeve 6, while in the embodiment of Fig. 2 two concentric flanged sleeves 6 and 16 are provided for confining said rolling elements 5 from both ends. The sleeves 6 and 16 are integrally connected to disc 3.

In the embodiment of Fig. 9, the balls 15, which serve as rolling elements, are held spaced to each other by a grooved sleeve 17 (Figs. 10 and 11), which is freely and independently rotatable with respect to discs 3 and 4. The sleeves 18 and 19 of Fig. 12 are similar in form and arrangement to sleeves 6 and 16 of Fig. 2. The function of these holding means is to keep the rolling elements always aligned along the wave- or wedge-like cam portions of disc 3, so that also the non-loaded rolling elements, for instance in the position shown in Fig. 8, maintain their mutual peripheral position and cannot be wedged one behind the other in axial direction.

In the illustrated examples, the cam portions of discs 3 and 4 of the pressure transformer form two waves spaced at 180°, but 3 and more uniformly distributed waves around the circumference of 360° can be provided. Considering that the pressure transmission of the described transformer or coupling depends only upon the relative position of discs 3 and 4 to each other, it follows that the coupling effort takes place, in clockwise, as well as in anticlockwise direction.

Fig. 8 discloses further that the axial distance $a$ of the coupling members 3 and 4 corresponds to an angular displacement $\alpha$ of the same. The corresponding positions of parts 3, 4, 11, and 12 are indicated in Fig. 1 by dotted lines.

The pressure transformer or coupling of this invention operates as follows: The rotating drive shaft 1 drives disc 3 through key 2. The rolling elements 5 or 15, respectively, transmit the torque to disc 4, a certain number of them being positively wedged between their wave- or wedge-like cam portions. This number, as will be noted on viewing Figs. 7 and 8, depends upon the axial distance of discs 3 and 4, which in turn depends on the controlled speed ratio. Changing this distance under load and running conditions results in a limited revolving movement of said elements 5 or 15, respectively, on the wave- or wedge-like cam portions of discs 3 and 4.

If the pressure transformer of the invention is applied to a variable speed drive mechanism, as indicated by way of example in Fig. 1, the disc 4 may be secured to, or made an integral part of, the driving inner race of the variable speed drive. The outer race, which is stationary in peripheral direction, is designated by 12. Balls 11 roll on races 4 and 12. A ball carrier or cage 13 forms the follower or driven member to transmit the power to the driven shaft. The outer race 12 can be shifted axially for the change of the speed ratio. In this case, the inner race 4 is shifted in opposite direction under the pressure of the pressure transformer. The torque transmitting balls 11 perform hereby a corresponding rolling movement in radial direction.

It is to be understood that the invention is not limited to the constructions herein specifically disclosed but can be embodied in other forms without departure from its spirit.

What I claim is:

1. In a torque loading device of the character described, a shaft, a driving rotary element operatively connected to said shaft, a driven rotary element freely rotatable on said shaft and displaceable in axial direction, said rotary elements having cooperating opposite wedging tracks composed of recesses formed by adjacent pairs of oppositely inclined surfaces, a plurality of substantially contiguous roller bodies in the wedging track of one rotary element, the driving and the driven rotary element being positively engaged in any operative position by the camming action of at least one roller body in each recess of their cooperating opposite wedging tracks, and means to hold all roller bodies aligned against the wedging track of one of said rotary elements.

2. A torque loading device as defined in claim 1 comprising truncated cones as roller bodies.

3. A torque loading device as defined in claim 1 comprising balls as roller bodies.

4. In a torque loading device of the character described, a shaft, a driving rotary element operatively connected to said shaft, a driven rotary element freely rotatable on said shaft and displaceable in axial direction, said rotary elements having an annular series of cooperating opposite cam portions composed of pairs of oppositely inclined surfaces, a plurality of roller bodies between each of said opposite cam portions, and a sleeve secured to one of the rotary elements to hold the roller bodies against inward radial displacement, said sleeve ending in a flange holding said roller bodies against the rotary element.

5. In a torque loading device of the character described, a shaft, a driving rotary element operatively connected to said shaft, a driven rotary element freely rotatable on said shaft and displaceable in axial direction, said rotary elements having an annular series of cooperating opposite cam portions composed of pairs of oppositely inclined surfaces, a plurality of roller bodies between each of said opposite cam portions, and a sleeve secured to one of the rotary elements to hold the roller bodies against outward radial displacement, said sleeve ending in a flange holding said roller bodies against the rotary element.

6. In a torque loading device of the character described, a shaft, a driving rotary element operatively connected to said shaft, a driven rotary element freely rotatable on said shaft and displaceable in axial direction, said rotary elements having an annular series of cooperating opposite cam portions composed of pairs of oppositely inclined surfaces, a plurality of roller bodies between each of said opposite cam portions, a collar freely rotatable on said shaft between the driving and the driven rotary element and supporting said roller bodies, and axial grooves on the periphery of said collar to hold said roller bodies in their spaced peripheral relationship.

7. In a torque loading device of the character described, a shaft, a driving rotary element operatively connected to said shaft, a driven rotary element freely rotatable on said shaft and displaceable in axial direction, said rotary elements having cooperating opposite wedging tracks composed of recesses formed by adjacent pairs of oppositely inclined surfaces, a plurality of substantially contiguous roller bodies in the wedging track of one rotary element, the driving and the driven rotary element being positively engaged in any operative position by the camming action of at least one roller body in each recess of their cooperating opposite wedging tracks, and at least one projection at one of said rotary elements cradling said roller bodies and holding the same against the wedging track of said rotary element.

8. In a torque loading device of the character described, a shaft, a driving rotary element operatively connected to said shaft, a driven rotary element freely rotatable on said shaft and displaceable in axial direction, said rotary elements having an annular series of cooperating opposite cam portions composed of pairs of oppositely inclined surfaces, a plurality of roller bodies between each of said opposite cam portions, a collar freely rotatable on said shaft between the driving and the driven rotary element supporting said roller bodies, and axial grooves on the periphery of said collar to hold said roller bodies in their spaced peripheral relationship, and means to hold the roller bodies against radial displacement.

References Cited in the file of this patent

UNITED STATES PATENTS

| Number | Name | Date |
|---|---|---|
| 1,401,505 | Sykora | Dec. 27, 1921 |
| 1,629,902 | Arter et al. | May 24, 1927 |
| 1,775,479 | Arter | Sept. 9, 1930 |
| 2,097,007 | Weisel | Oct. 26, 1937 |
| 2,125,998 | Erban | Aug. 9, 1938 |
| 2,239,087 | Erban | Apr. 22, 1941 |
| 2,571,851 | Floyd et al. | Oct. 16, 1951 |